April 5, 1927. 1,623,908
G. E. CAMPBELL
CHAIN DRIVEN BELT FEED WORKS FOR SAWMILLS
Filed Sept. 24, 1924 4 Sheets-Sheet 2
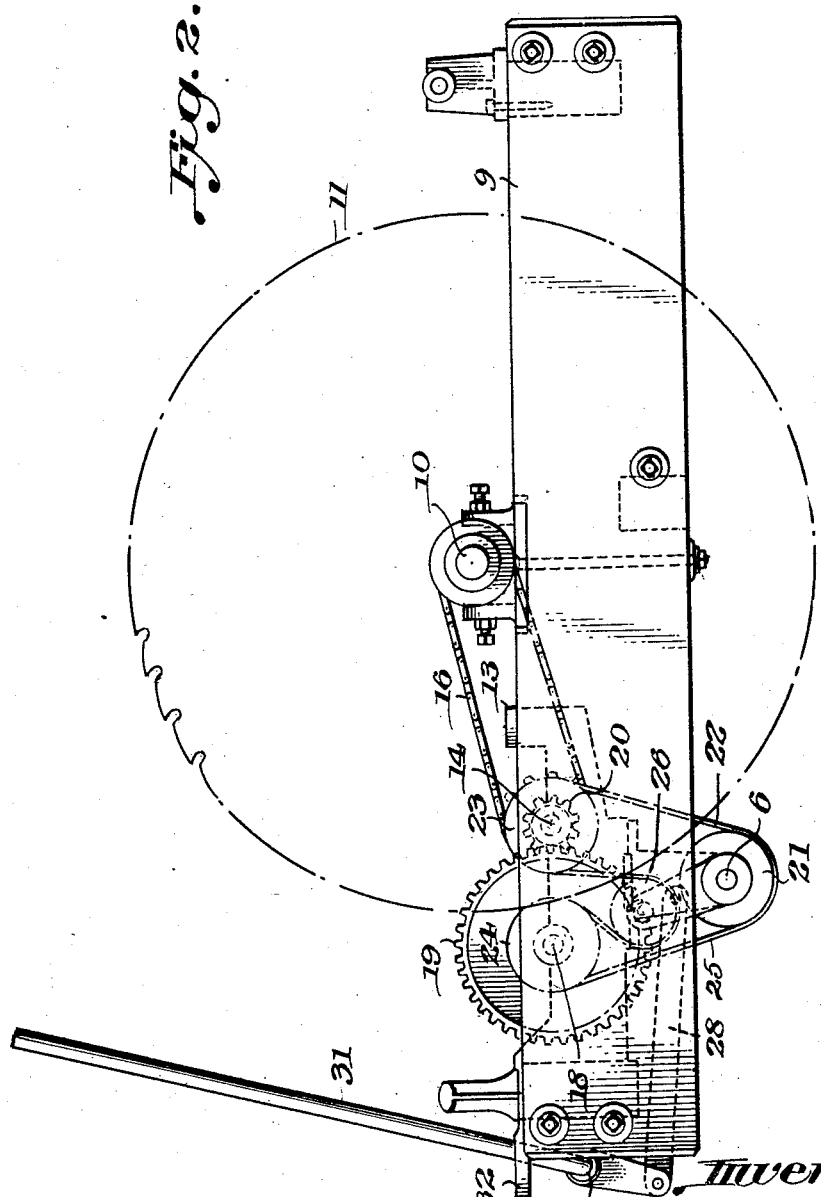

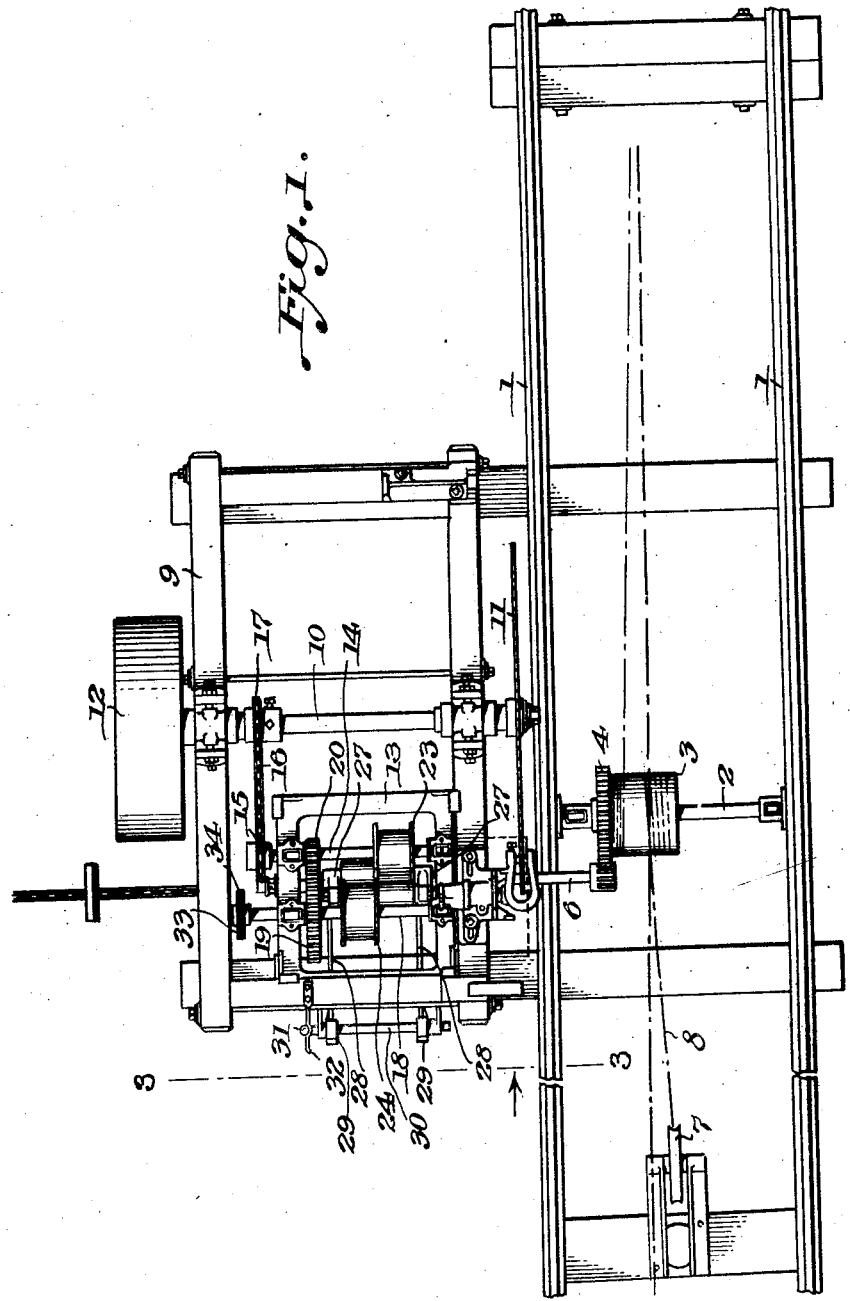

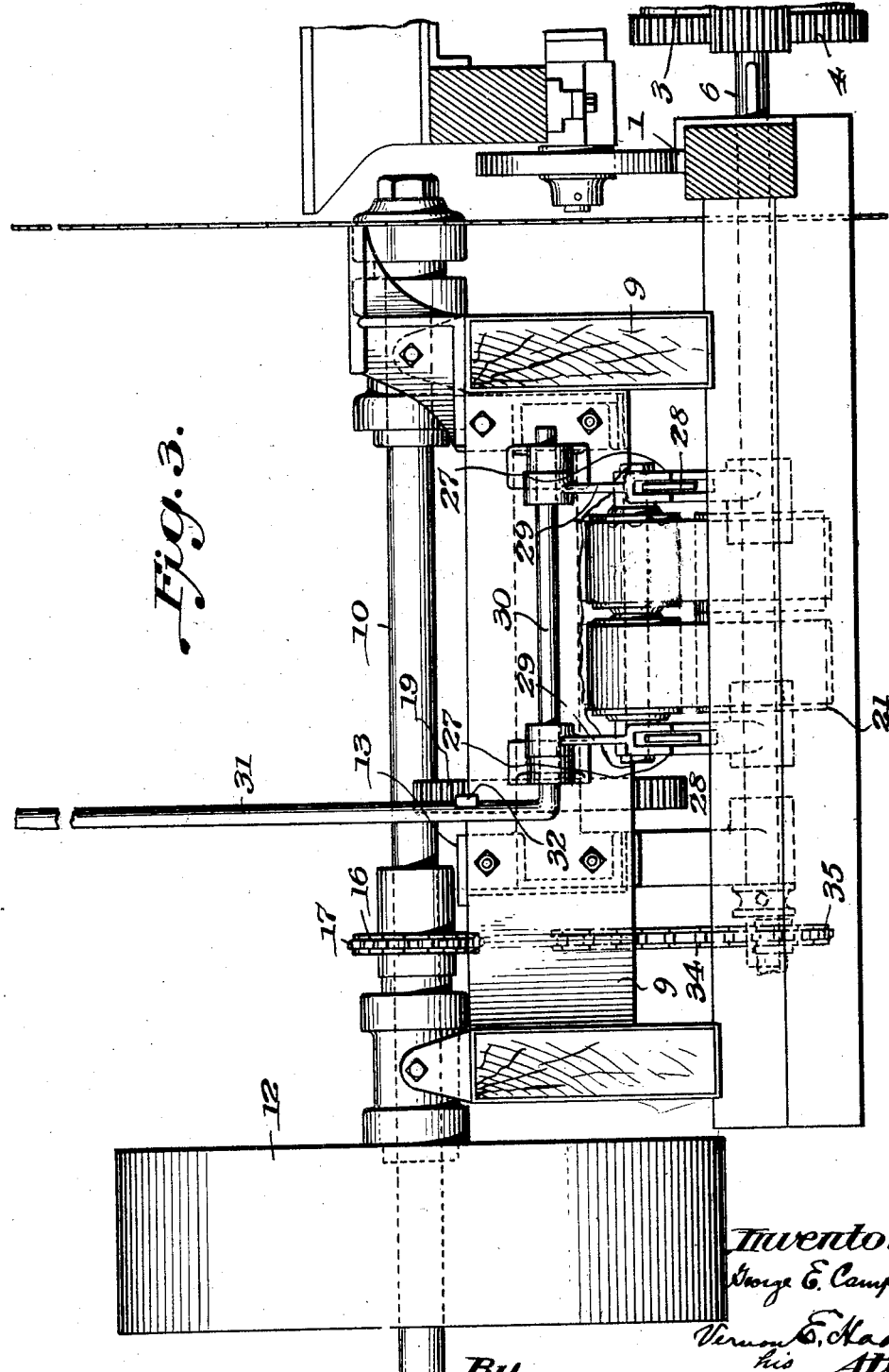

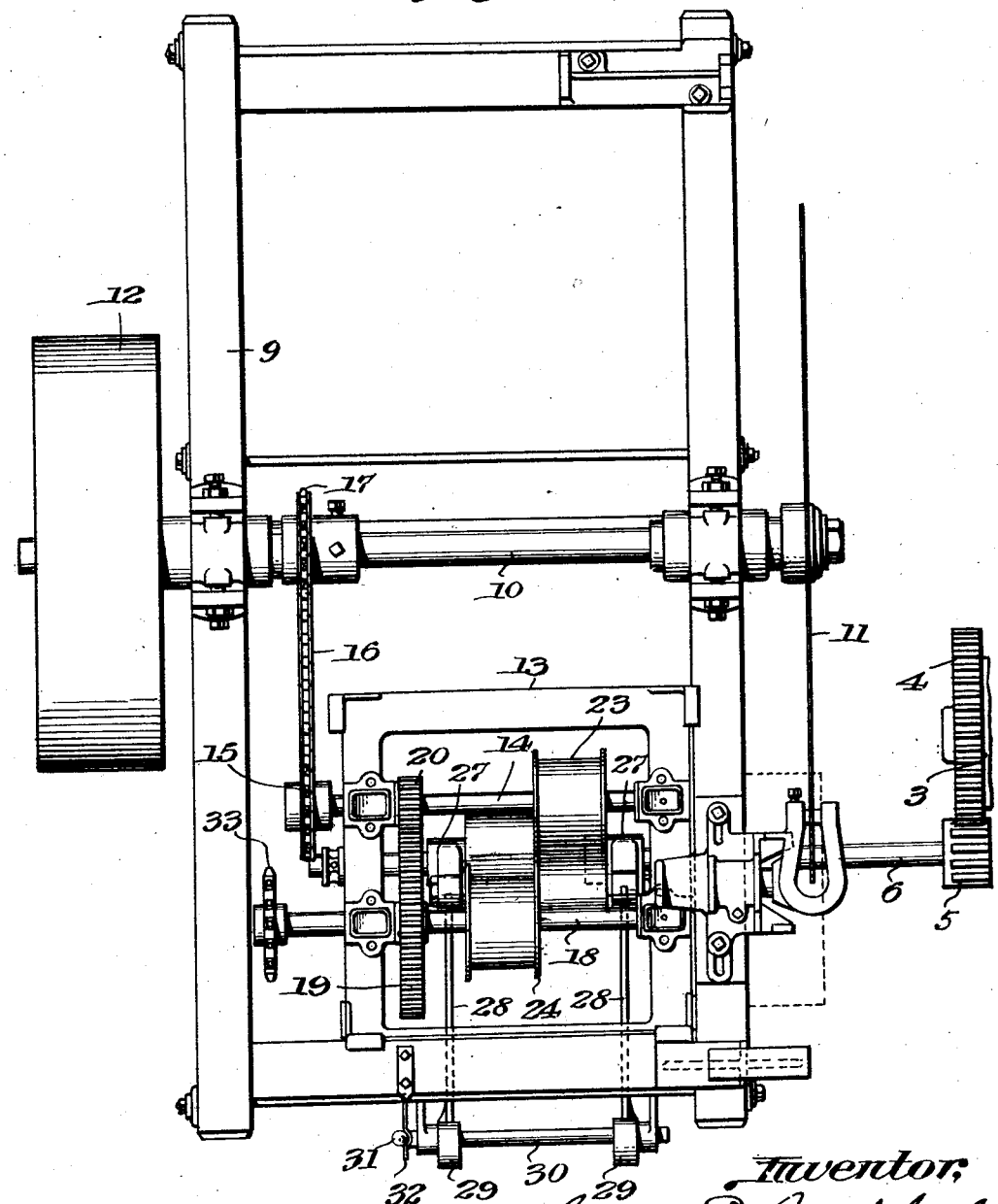

Patented Apr. 5, 1927.

1,623,908

UNITED STATES PATENT OFFICE.

GEORGE E. CAMPBELL, OF CHATTANOOGA, TENNESSEE, ASSIGNOR TO THE WHELAND COMPANY, OF CHATTANOOGA, TENNESSEE, A CORPORATION OF TENNESSEE.

CHAIN-DRIVEN BELT FEED WORKS FOR SAWMILLS.

Application filed September 24, 1924. Serial No. 739,637.

This invention relates to chain driven belt feed works for saw mills, and the object of the invention is to construct a compact, self-contained feeding unit driven preferably from the saw-arbor.

In the accompanying drawings:—

Fig. 1 is a top plan view;

Fig. 2 is a side elevation of the feeding unit;

Fig. 3 is a transverse vertical sectional view on line 3—3 of Fig. 1;

Fig. 4 is an enlarged top plan view of the actuating mechanism.

As indicated in Fig. 1, the numeral 1 indicates the tracks upon which a saw-mill carriage is operated. Arranged beneath the tracks is a feed-drum shaft 2, upon which is mounted the feed-drum 3, provided with a gear 4 meshing with a pinion 5 arranged on the shaft 6 leading to the feed drum mechanism. The numeral 7, indicates a cable sheave arranged at each end of the track, around which is run a cable 8, which also wraps around, and may be fastened to, drum 3, the ends of which are secured to the carriage (not shown in the drawing).

This cable is attached at a predetermined point to a carriage whereby the latter is moved back and forth upon the tracks.

The feeding-unit preferably consists of a rectangular frame 9 arranged laterally of the tracks. Upon the frame is supported the saw-arbor 10 having secured to its inner end the saw 11, and at its outer end a main drive pulley 12. Mounted within the frame 9 is a frame 13, in which is rotatably supported a pinion-shaft 14 having fastened to one end thereof a sprocket 15, which is driven by a sprocket-chain 16 running around a sprocket-wheel 17 fastened to the saw-arbor.

The numeral 18 indicates a gear-shaft mounted in the frame 13, and arranged parallel with the pinion-shaft 14. A gear 19 keyed to the gear-shaft 18 meshes with a pinion 20 keyed to the pinion-shaft 14. The shafts 14 and 18 therefore run in opposite directions. As best illustrated in Figs. 2 and 3, the pinion-shaft 6 which is adapted to drive the feed-drum 3 is suspended beneath the main frame 9 directly beneath the pinion-shaft 14 and the gear-shaft 18. Keyed to the pinion-shaft 6 are drive pulleys 21, one of which is driven by means of a belt 22 which passes over a drive pully 23 keyed to the pinion-shaft 14. This drive constitutes the mechanism for the forward drive of the carriage or the work drive. Keyed to the gear-shaft 18 is a belt pulley 24 carrying a belt 25, which also surrounds the pulley 21 on the pinion-shaft 6.

As illustrated in Fig. 1, the drive-pulleys 23 and 24 are offset and interposed therebetween, between their inner faces are two idler-pulleys 26 shown in Fig. 2 mounted upon a shaft 27' carried by the rock-arms 27, 27, which are loosely journaled upon the pinion-shaft 6. The rock-arms 27 are connected by links 28, 28, to rock-arms 29, 29, fastened to a stub-shaft 30 carried at the outer end of the main frame 9. This rock-shaft 30 is provided with an actuating-lever 31 projecting upwardly therefrom, said lever being held in its normal vertical inoperative position, by a notched spring strap 32.

It will be observed that the pinion-shaft 14 and the gear-shaft 18 run in opposite direction, and with the shifting of the idlers 26 either the forward drive belt 22 is tightened, or the rear drive belt 25 is tightened, it being impossible to tighten both of these belts simultaneously, in this way effecting a comparatively low speed forward or feed drive, and a comparatively high speed backward or return drive, due to the ratio of the gears of the pinion 20 and the gear 19. The drive-belts 22 and 25 as observed assume practically a vertical position; therefore the idler-belt exerts comparatively very little friction upon the pulley of the feed-shaft 6, thus permitting of this form of belt drive.

Keyed to the gear-shaft 18 is a sprocket 33 carrying a chain 34 leading to a sprocket 35, which drives an endless conveyor, the outer end of which is suitably supported a suitable distance from the saw-dust pit, the conveyer serving to carry the saw-dust as it is accumulated from the pit beneath the saw.

It will thus be seen that I have constructed a saw-mill feed-works which is very compact in construction and a self-contained unit, which may be readily attached to any standard saw-mill carriage, and one wherein there are comparatively few parts for obtaining the results required in a feed unit of this kind.

It is obvious that more or less slight changes might be made without departing from the general scope of the invention.

I claim:

1. The combination of at least two drive shafts spaced apart horizontally, a driven shaft arranged in a vertical plane passing substantially midway between said drive shafts, belts arranged on the driven shaft and extending substantially vertically to said drive shafts, and belt tightening pulleys arranged substantially in longitudinal alignment with each other and in position to bear upon and tighten the belts on the driven shaft and at least one of the drive shafts for transmitting power to said driven shaft.

2. The combination of at least two drive shafts spaced apart horizontally, a driven shaft arranged at a point below said drive shafts, and in a vertical plane passing substantially midway between said drive shafts, belts arranged side by side on said driven shaft and extending substantially vertically to said drive shafts, and belt tightening pulleys arranged substantially in alignment with each other and in position to bear upon and tighten the belts on the driven shaft and a corresponding drive shaft for transmitting power to said driven shaft.

3. The combination of at least two drive shafts spaced apart horizontally, a driven shaft arranged in a vertical plane passing substantially midway between said drive shafts, belts arranged on the driven shaft and extending substantially vertically to said drive shafts, belt tightening pulleys arranged in longitudinal alignment with each other and in position to bear upon and tighten the belts on the driven and driving shafts, trunnions extending laterally from the belt tightening pulleys, links pivotally mounted on said driven shaft and receiving the trunnions to support the belt tightening pulleys, and arms pivotally connected with the links for moving the belt tightening pulleys into engagement with the belts to operatively connect the driven shaft with one of the drive shafts.

4. The combination of two drive shafts arranged in a substantially horizontal plane, gearing connecting said shafts together to turn in opposite directions, means for driving said shafts, a driven shaft arranged at a point below said drive shafts, and in a vertical plane passing substantially midway between said drive shafts, belts extending substantially vertically from said driven shaft to said drive shafts, and arranged side by side on said driven shaft, belt tightener pulleys arranged in alignment with each other between said belts to bear upon and tighten the belts on the driven and driving shafts, trunnions extending laterally from said belt tightener pulleys, links pivotally mounted on said driven shaft and receiving the trunnions to support the belt tightener pulleys, and arms pivotally connected with said links intermediate the driven shaft and trunnions for moving the belt tightener pulleys into engagement with the belts to operatively connect said driven shaft with one of the drive shafts.

In testimony whereof I affix my signature.

GEORGE E. CAMPBELL.